United States Patent [19]

Philibert et al.

[11] Patent Number: 4,908,873
[45] Date of Patent: Mar. 13, 1990

[54] DOCUMENT REPRODUCTION SECURITY SYSTEM

[76] Inventors: Alex C. Philibert, 3001 Mockingbird Dr.; Jack W. Smith, 1831 Exeter Dr.; James W. Fox, 172 Andrea Dr., all of Sierra Vista, Ariz. 85635

[21] Appl. No.: 494,315

[22] Filed: May 13, 1983

[51] Int. Cl.⁴ .............................................. G06K 9/68
[52] U.S. Cl. ...................................... 382/34; 283/902; 340/825.34; 355/201
[58] Field of Search .................. 358/256, 258; 356/71; 340/825.34; 382/30, 34; 355/133; 250/556; 235/437, 438; 283/902

[56] References Cited

U.S. PATENT DOCUMENTS

| | | | |
|---|---|---|---|
| 3,261,911 | 7/1966 | Bailey et al. | 178/6 |
| 3,597,082 | 8/1971 | James | 355/133 |
| 3,807,852 | 4/1974 | Hoydic | 355/7 |
| 3,831,007 | 8/1974 | Braun | 235/61.11 |
| 3,852,088 | 12/1974 | Godlewski et al. | 117/1 |
| 3,886,521 | 5/1975 | Dobras | 235/437 |
| 3,977,785 | 8/1976 | Harris | 355/133 |
| 3,984,637 | 10/1976 | Caudill et al. | 179/2 |
| 4,025,673 | 5/1977 | Reinnagel | 428/29 |
| 4,064,389 | 12/1977 | Patterson | 235/431 |
| 4,084,196 | 4/1978 | Tisue et al. | 358/283 |
| 4,118,122 | 10/1978 | Rees et al. | 355/77 |
| 4,147,429 | 4/1979 | Lysle | 355/133 |
| 4,179,212 | 12/1979 | Lahr | 355/133 |
| 4,334,241 | 6/1982 | Kashioka et al. | 382/45 |
| 4,586,811 | 5/1986 | Kubo et al. | 355/133 |
| 4,588,286 | 5/1986 | Stockburger et al. | 355/133 |
| 4,588,292 | 5/1986 | Collins | 356/71 |

OTHER PUBLICATIONS

Bacon et al., "Copier Security System" *IBM Tech. Disc. Bulletin*, vol. 18, No. 6, Nov. 1975, pp. 1747–1748.
Boggs and Ernst, "Copier Incorporating Document Detection System," IBM Tech. Disclosure Bull., vol. 15, No. 7, Dec. 1972.
Marinace, "Copier System for Confidential Papers," IBM Tech. Disc. Bull., vol. 15, No. 17, Dec. 1972.
Boggs and Ernst, "Unauthorized Copy Prevention," IBM Tech. Disc. Bull., vol. 15, No. 12, May 1973.
Boggs and Woodward, "Gradiometer Document Detector for Copy Security," IBM Tech. Disc. Bull., vol. 16, No. 6, Nov. 1973.
Harr et al., "'No-Copy' Attachment for Copier," IBM Tech. Disc. Bull., vol. 17, No. 11, Apr. 1975.
Bacon, "Secure Document Feature for Copy Machines," IBM Tech. Disc. Bull., vol. 17, No. 11, Apr. 1975.
Simpson, "Copier Document Security," IBM Tech. Disc. Bull., vol. 17, No. 11, Apr. 1975.
Weinberg, "Document Copying Inhibitor Method," IBM Tech. Disc. Bull., vol. 17, No. 12, May 1975.
Bruce, "Unauthorized Copy Prevention," IBM Tech. Disc. Bull., vol. 18, No. 1, Jun. 1975.
Galli and Melz, "Copier Security System," IBM Tech. Disc. Bull., vol. 18, No. 3, Aug. 1975.
Bacon and Hildenbrandt, "Secure Document Feature for Copy Machines," IBM Tech. Disc. Bull., vol. 18, No. 4, Sep. 1975.
Queener, "Document Copy Prevention," IBM Tech. Disc. Bull., vol. 18, No. 6, Nov. 1975.
Guido, "Preventing Copying of Classified Information," IBM Tech. Disc. Bull., vol. 19, No. 4, Sep. 1976.
Hildenbrandt, "Document Security for Copiers," IBM Tech. Disc. Bull., vol. 19, No. 9, Feb. 1977.

*Primary Examiner*—Leo H. Boudreau
*Assistant Examiner*—J. Marcus
*Attorney, Agent, or Firm*—Cushman, Darby & Cushman

[57] ABSTRACT

A system for selectively effecting operation of a copying or facsimile machine in accordance with the textual content of a scanned document. The system includes an optical character reader which generates scanned character code signals representative of characters comprising at least a portion of the text of the document, a memory for storing at least one correlation criterion, and a processor for selectively effecting operation of the copying or facsimile machine in accordance with the correlation of the criterion to the text.

19 Claims, 2 Drawing Sheets

DOCUMENT REPRODUCTION SECURITY SYSTEM

BACKGROUND OF THE INVENTION

The present invention relates to a security system for selectively enabling or inhibiting operation of a document processing apparatus such as a copier or facsimile transmission apparatus.

In general, security systems for controlling copying of documents are known. For example, various systems have been proposed wherein confidential documents are printed on paper having particular physical characteristics and/or with ink having particular characteristics that prevents the copier apparatus from perceiving the printed matter. Examples of such systems are described in U.S. Pats. No. 4,118,122 issued to Rees et al on Oct. 3, 1978; 4,025,673 issued to Reinnagel on May 24, 1977; 3,852,088 issued to Godlewski et al issued on Dec. 3, 1974; 3,831,007 issued to Braun on Aug. 20, 1974; and 3,807,852 issued to Hoydic issued on Apr. 30, 1974. Other such systems are described in Hildenbrandt "Document Security for Copiers" IBM Technical Disclosure Bulletin Volume 19 No. 9, February 1977; Bruce, "Document Copy Prevention" IBM Technical Bulletin Volume 18 No. 1, June 1975; and Weinberg "Document Copying Inhibitor Method" IBM Technical Disclosure Bulletin Volume 17, No. 12, May 1975.

Other systems detect particular characteristics of the paper or ink or preprinted indicia on paper to identify confidential documents and inhibit copier operation. Examples of such systems are described in Boggs et al, "Copier Incorporating Document Detection System," IBM Technical Disclosure Bulletin Volume 15, No. 7 December 1972; Harr et al, "'No-Copy' Attachment for Copier" IBM Technical Disclosure Bulletin Volume 17 No. 11 April 1975; Simpson, "Copier Document Security" IBM Technical Disclosure Bulletin Volume 17 No. 11, April 1975; Galli et al, "Copier Security System," IBM Technical Disclosure Bulletin Volume 18 No. 3, August 1975; Queener, "Document Copy Prevention" IBM Technical Disclosure Bulletin, Volume 18.No. 6 November 1975; Bruce, "Unauthorized Copy Prevention", IBM Technical Disclosure Bulletin Volume 18 No. 1, June 1975; Guido, "Preventing Copying of Classified Information" IBM Technical Disclosure Bulletin Volume 19 No. 4, September 1976; U.S. Pat. No. 3,597,082 issued to James et al on Aug. 3, 1971; and U.S. Pat. No. 3,977,785 issued to Harris on Aug. 31, 1976.

For example, Guido describes a system wherein preprinted bar-codes are detected by a scanner and compared by a microprocessor to classification ratings and passwords maintained in a read only memory. The person operating the copier is then required to enter a password before copying of a confidential document can be effected.

The Harris patent describes a system where preprinted coded information on a document is optically correlated with a reference pattern, to inhibit operation of the copying machine in the absence of proper correlation.

Other systems utilize a metallic or conductive tag or a conductive paper to prevent copying of secured information. Examples of such systems are described in Boggs et al, "Unauthorized Copy Prevention" IBM Technical Disclosure Bulletin Volume 15 No. 12, May 1973; Boggs et al "Gradiometer Document Detector for Copy Security" IBM Technical Disclosure Bulletin Volume 16 No. 6, November 1983; Bacon, "Secure Document Feature for Copy Machines" IBM Technical Disclosure Bulletin Volume 17 No. 11, 1975; and Bacon et al "Secure Document Feature for Copy Machines" IBM Technical Disclosure Bulletin Volume 18 No. 4, September 1975.

Other systems, such as described in Marinace, "Copier System for Confidential Papers" IBM Technical Disclosure Bulletin Volume 15 No. 7, December 1972 requires that indicia of user identification be provided the copying machine before the machine will operate.

Security systems for facsimile transmission apparatus are also, in general, known. An example of such a system is described in U.S. Pat. No. 3,261,911 issued to Bailey et al Jul. 19, 1966. Security systems for use in a computer system having remote terminals are also known. See, e.g. U.S. Pat. No. 3,984,637 issued on Oct. 5, 1976 to Caudill et al.

The prior art systems tend to be disadvantageous in that they require that secured documents be printed on specially treated paper stock having predetermined characteristics, or with particular ink, or on paper bearing preprinted visual indicia, e.g. particular patterns or bar-codes, that tend to be subject to masking by an unauthorized user.

SUMMARY OF THE INVENTION

The present invention provides a copy security system which does not require the use of specifically treated or prepared paper stock, and is not susceptible to masking of indicia by unauthorized users.

In accordance with the present invention, at least a portion of the text of the document is read and correlated against a predetermined code to determine whether the text contains a predetermined sequence of alphanumerics, symbols, or the like. The copier or facsimile machine is inhibited or enabled in accordance with the results of the correlation.

BRIEF DESCRIPTION OF THE DRAWINGS

A preferred exemplary embodiment will hereinafter be described with reference to the appended drawing, wherein like numerals denote like elements

DETAILED DESCRIPTION OF A PREFERRED EXEMPLARY EMBODIMENT

Figure 1:
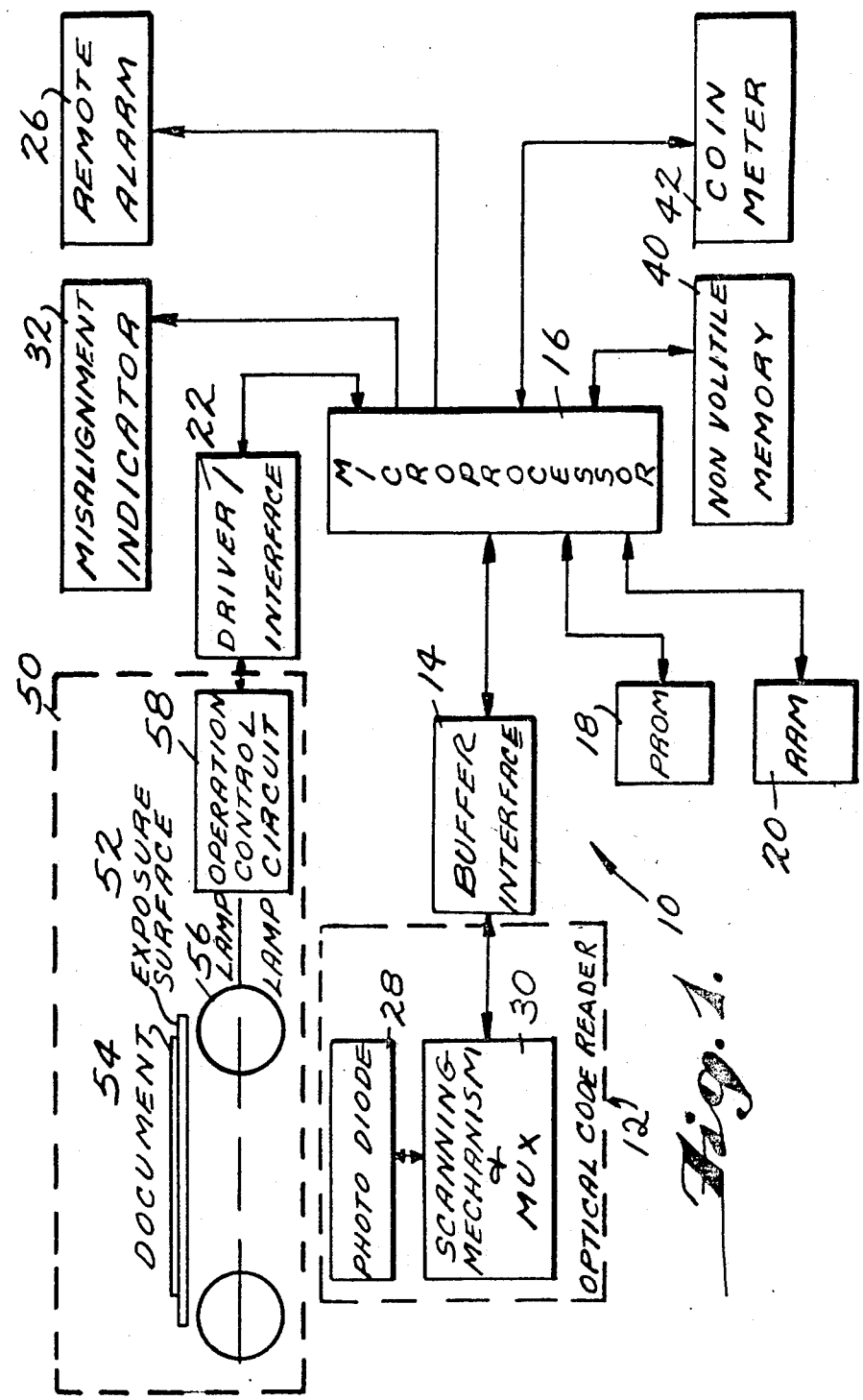
FIG. 1 is a block schematic of a copy security system in accordance with the present invention.

Referring now to FIG. 1, a security system 10 in accordance with the present invention, is adapted for cooperating with a photocopier or facsimile transmission device or the like, generally indicated as 50. Copier/facsimile apparatus 50 suitably includes an exposure surface 5 for receiving and aligning a document 54 to be copied, transmitted or otherwise scanned in predetermined disposition to respective exposure lamps 56 and copying and/or scanning mechanisms (not shown). Apparatus 50 also includes conventional operation control circuitry 58 for effecting operation of the lamps, copying and/or scanning mechanisms.

Security system 10 suitably comprises an optical code reader 12 coupled, through a suitable buffer/interface 14, to a conventional microprocessor 16. Microprocessor 16 in turn communicates with a conventional programmable read only memory (PROM) 18 and random access memory (RAM) 20. In addition, microprocessor 16 also communicates with suitable driver/interface circuitry 22, cooperating with operation control circuitry 58 of copier/facsimile apparatus 50.

Microprocessor 16 suitably also communicates with an alarm device 26, preferably located remotely from the copier or facsimile apparatus, and a misalignment indicator 32, located on or proximate to cooperating apparatus 50, as well as, if desired, a suitable non-volatile random access memory 40 and coin meter 42.

If microprocessor 16 determines that a predetermined character word, or sequence of characters and spaces or the like is present (or that a predetermined character, word or sequence of characters is not present), microprocessor 16 will generate a control signal through suitable driver/interface circuitry 22 to the control circuitry of the cooperating copier/facsimile machine.

PROM 18 contains the operating program of system 10, as well as a bank of acceptable character codes and indicia of one or more correlation criteria, i.e. correlation programs, as will be explained.

Document 54 is disposed on exposure surface 52 of copier/facsimile machine 50. As will be explained, through operations upon the stored banks of acceptable character codes, various misalignments of document 54 on surface 52 can be accommodated. Suitably, document 54 can be disposed on the exposure surface with 2 degrees of freedom: document 54 can be disposed top up or top down, but not obliquely on exposure surface 52. Document 54 is suitably illuminated by one or more lamps 56 in cooperating apparatus 50 (or by lamps associated with scanner 12).

Optical code reader 12 is disposed to scan document 54 when aligned on exposure surface 52, and suitably comprises a photodiode array 28 cooperating with a suitable scanning mechanism and/or multiplexer 30.

Optical code reader 12 scans at least a predetermined portion of document 54 and generates a sequence of digital character code signals representative of the characters of text within the scanned portion of document 54. Photodiode array 28 can be physically scanned to sense characters in the predetermined portion of document 54, such as, for example, raster-scanned, or photodiode array 28 can be sufficiently large to cover the entirety of the predetermined portion, and electronically scanned, or a combination of electronic and physical scanning can be utilized, as is well known in the art.

The respective digital character code signals generated by optical code reader 12 are applied, through suitable buffer/interface circuitry 14 and are routed by microprocessor 16 to RAM 20 for temporary storage. The respective locations in RAM 20 are suitably correlated to the individual (scan) lines of document 54 (e.g., each line of document 54 as scanned has a group of locations in RAM 20 associated therewith), in which the character codes associated with that line are stored.

The nature and alignment of document 54 is then tested for compatability with system 10. The respective scanned character codes stored in RAM 20 are compared to the acceptable character codes stored in PROM 18. If the character codes generated by optical code reader 12 are not among the acceptable character codes, it is indicative of possible reversal or misalignment of document 54 on exposure surface 52.

The respective bits of the scanned character codes are therefore suitably reordered, in accordance with a predetermined algorithm, to "effectively" transform the codes to represent characters "translated" or "reoriented" with respect to the scanner, when the original scanned character codes do not correlate with the acceptable code bank. More specifically, in generating the character code in respect of a particular character space (pixel), photodiode array 28 of optical code reader 12 generates a plurality of signals indicative of the presence or absence of marking in respective associated portions of the pixel. The respective signals are provided in a predetermined order indicative of the portions of the character space (pixel) which they represent. Thus, if, for example, document 54 is disposed top down on surface 52, the characters will appear top down within the respective pixel. The code word generated by scanner 12 would reflect such misalignment, and the order of the bits thereof would be, e.g. reversed from the proper code for the character. Accordingly, by reordering the bits of the scanned character code words, and correlating the reordered codes with acceptable code banks, various misalignments of document 54 can be detected and accommodated. Alternatively, reordered character codes can be included in PROM 18, and the scanned character codes compared to each bank of acceptable codes. Appropriate cognizance of detected misalignment is taken in the correlation programs. For example, the order of the lines, and characters within the lines, are reversed when document 54 is disposed top down on surface 52.

Misalignment accommodation programs can be provided for various types of misalignments of document 54 on exposure surface 52. Suitably, system 10 will accommodate at least documents disposed top down on surface 52.

If the stored character codes do not match the acceptable codes stored in PROM 18 initially, or after reversal or other compensatory procedures, misalignment indicator 32 can be activated and copying inhibited. An override can be provided, if desired, to permit copying of nonstandard format documents.

After it is determined that document 54 is compatible with system 10, the scanned text is correlated with predetermined criteria stored in PROM 18 to determine whether or not the document is confidential or otherwise secured. A correlation program stored in PROM 18 is executed by microprocessor 16 to determine whether or not one or more predetermined character, symbol or sequence of characters, symbols and/or spaces, or the like are contained in the text, or within a particular portion of the text. In accordance with the results of the correlation, microprocessor 16 then inhibits or enables apparatus 50 (by selectively generating an appropriate control signal through driver/interface 22 to control circuit 58 of apparatus 50), actuates remote alarm 26 and/or effects other appropriate actions, as will be explained.

System 10 can be programmed to operate with a wide variety of enabling or inhibiting criteria, which may vary greatly in complexity and sophistication. For example, microcomputer 16 and PROM 18 can be programmed to inhibit operation of the control circuitry 58 of the cooperating copier/facsimile machine if the word "confidential" is detected within a predetermined area of document 54, e.g. the top ten scan lines. Microprocessor 16 can also be programmed to effect operation of alarm 26, suitably disposed at a remote location such as a security office to alert appropriate authorities that an attempt is being made to copy confidential or secret materials. Steganographic encoding can also be detected and operated upon by system 10 to prevent copying or transmission of a document or activate an alarm. Such steganographic encoding permits discrimination of the documents by system 10, without overtly alerting the person making the unauthorized copy/transmission. Even if the unauthorized copier was generally aware of the system and masked any non-encrypted criteria indicia (e.g. the word "confidential") on the documents, the steganographic code criteria would be detected and appropriate action effected by system 10. For example, remote alarm 26 may be actuated and apparatus 50 inhibited (or not inhibited as desired).

System 10 can also be used to tabulate the number of copies made of particular documents or classes of documents. For example, respective copyright notices can be utilized as criteria code indicia. A particular location in non-volatile memory 40 can be assigned to each copyright notice code. Each time a particular copyright notice is detected by system 10, a count contained in the associated location in non-volatile memory 40 is incremented. In this manner, a royalty account can be maintained for each of the copyright holders.

If desired, a suitable coin meter 42 (apparatus for adapting the copier/facsimile machine for coin operation) can be integrated into the system. Upon detection of one of the copyright notice codes, coin meter 42 would be actuated and deposit of a prerequisite amount of money would be required before the copier/facsimile machine operation control circuitry 24 would be actuated.

Figure 2:
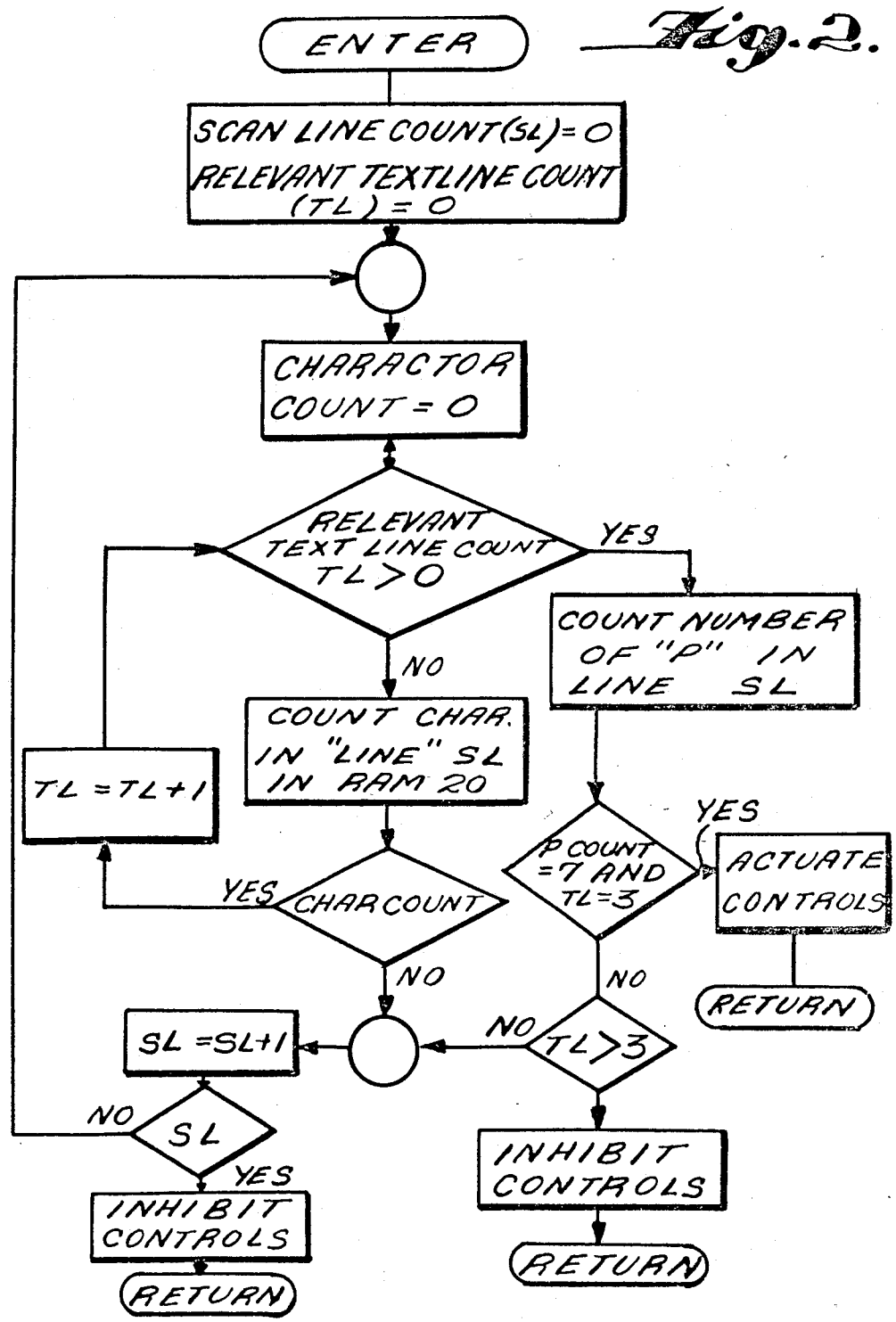
FIG. 2 is a schematic flowchart of an exemplary correlation program for use in the system of FIG. 1.

Referring now to FIG. 2, an exemplary correlation scheme will be described. In the particular example, a specific document format is defined: all non-relevant lines preceding relevant text can contain no more than 30 characters per line; the first three lines of relevant text contain at least 30 characters per line, and occur within the first 20 scan lines of the document. In the particular example, operation of the copier/facsimile apparatus is enabled only if the letter "P" occurs seven times in the first three lines of text.

As previously noted, the stored character codes are stored in groups of locations in RAM 20 corresponding to the scan lines by optical code reader 12. A scan line count (SL), a relevant text line count (TL) and a character count are initialized to zero. The stored scanned character data is then analyzed on a line-by-line basis to determine if the particular scan line is "relevant" text. The characters in the first scan line (SL=0) stored in RAM 20 are counted to determine whether the character count is greater than 30. If the character count is not greater than 30, the scan line count (SL) is incremented and the next scan line of characters stored in RAM 20 is addressed and analyzed. This process is repeated until a relevant text line (containing 30 characters) is detected or more than 20 scan lines are addressed without detecting a relevant text line. When a relevant text line having a character count greater than 30 is detected, the relevant text line count (TL) is incremented, and the number of occurrences of the letter P in the line is counted. If the P count is not equal to seven, concurrently with the relevant text line count being equal to three, the scan line count (SL) is again incremented and the next scan line of data in RAM 20 addressed. This procedure continues until a P count equal to seven is detected in the first three lines of text, in which case, copier/facsimile machine operation control circuitry 58 is enabled and actuated, or until three lines of text are scanned, and the letter P does not occur seven times, or 20 lines of data are scanned without detecting three lines of text, in which cases apparatus 50 is inhibited.

It will be understood that while various of the conductors/connections shown in the drawing are depicted as single lines, they are not so shown in a limiting sense, and may comprise plural conductors/connections as is understood in the art. Further, the above description is of a preferred exemplary embodiment of the present invention, and the invention is not limited to the specific forms shown and described. For example, a plurality of different correlation routines may be maintained in PROM 18, and utilized selectively, or sequentially in respect of a given document. Moreover, essentially any correlation code may be utilized, and such codes can be as simple or as complex as the application requires. Also, when used in conjunction with a facsimile machine already including an optical code reader or other mechanism for generating character codes, the existing mechanism can be utilized in system 10, and a separate optical code reader 12 would not be necessary. Also, if desired, in order to economize on memory, only the relevant text of a document can be stored in RAM 20, and the header, letterhead, etc., not relevant to the criteria, can be omitted. This would be accomplished by performing, for example, character count steps upon the data before storing the data in RAM 20. Similarly, if desired, the comparison of the detected character patterns to acceptable patterns can be incorporated into the correlation routine. Similarly, memory conservation routines can be utilized. These and other modifications may be made in the design and arrangement of the elements without departing from the spirit of the invention as expressed in the appended claims.

What is claimed is:

1. A system for selectively effecting operation of a copying apparatus in accordance with the textual content of a scanned document, said copying apparatus including an operation control circuit responsive to control signals applied thereto for actuating said copying apparatus, said system comprising:

optical character reader means, for generating respective scanned character code signals indicative of the respective characters comprising at least a portion of the test of said document;

memory means for storing indicia of at least one correlation criterion in respect of said portion of text; and processor means, responsive to said scanned character code signals, for selectively generating said control signals to said operation control circuit for enabling or inhibiting said copying apparatus in accordance with a correlation of said criterion with said portion of text.

2. The system of claim 1 wherein said correlation criterion comprises a steganographic code.

3. The system of claim 1 further including random access memory means for temporarily storing indicia of said scanned character code signals;

means for storing indicia of a set of acceptable character codes;

means for comparing said indicia of said scanned character code signals to said stored indicia of acceptable character codes; and means, responsive to signals indicative of an unfavorable comparison, for selectively generating document misalignment alarm indicia.

4. The system of claim 1 wherein said system further comprises non-volatile memory means, responsive to control signals from said processor means, for maintaining a count indicative of the number of documents scanned correlating with said criterion.

5. The system of claim 4 wherein said criterion is a copyright notice.

6. The system of claim 4 wherein said memory means contains indicia, of a plurality of criteria; and said non-volatile memory means contains at least a respective location associated with each of said criteria, each for maintaining a respective count indicative of the number of documents scanned correlating with said associated criteria.

7. The system of claim 1 further including random access memory means for temporarily storing indicia of said scanned character code signals;

means for storing indicia of a set of acceptable character codes;

means for comparing said indicia of said scanned character code signals to said stored indicia of acceptable character codes; and means, responsive to a signal indicative of an unfavorable comparison between said indicia of said scanned character signals and said indicia of acceptable character codes, for altering said indicia of said scanned characters in a predetermined manner; and means for comparing said altered indicia of said scanned characters to said indicia of acceptable character codes; and means, responsive to signals indicative of an unfavorable comparison, for selectively generating document misalignment alarm indicia.

8. The system of claim 1 wherein said criteria is a predetermined sequence of characters.

9. The system of claim 1 wherein said copying apparatus is a copier.

10. The system of claim 1 wherein said copying apparatus is a facsimile machine.

11. The system of claim 1 wherein said processor means comprises a random access memory and a microprocessor, said microprocessor cooperating with said memory means and said random access memory.

12. A method of selectively effecting operation of a copying apparatus in accordance with the textual content of a document, comprising the steps of:

optically scanning said document to generate respective character code signals indicative of the respective characters of the text of a portion of said document;

correlating said code signals with at least one predetermined pattern of characters, to determine the existence of said predetermined pattern of characters in the text of the portion of said document; and selectively effecting operation of said copying apparatus in accordance with the results of said correlation.

13. The method of claim 12 further comprising the steps of:

storing indicia of respective acceptable character code signals;

comparing said generated character code signals to said acceptable character code signals; and generating alarm indicia in response to an unfavorable comparison.

14. The method of claim 12 further comprising the steps of:

storing indicia of respective acceptable character code signals;

comparing said generated .character code signals to said acceptable character code signals;

altering said generated character codes in accordance with a predetermined algorithm in response to an unfavorable comparison between said generated code signals and said acceptable code signals;

comparing said altered code signals to said acceptable character code signals; and generating an alarm indicia in response to an unfavorable comparison between said altered code signals and said acceptable code signals.

15. The method of claim 12 wherein said predetermined pattern of characters comprises a copyright notice and said method further includes the step of:

maintaining a count indicative of the number of documents scanned that include said copyright notice.

16. The method of claim 12 further including the step of:

generating alarm indicia in response to scanning of documents not containing said predetermined pattern of characters.

17. The method of claim 12 wherein:

said correlating step comprises determining the presence of a first overt predetermined pattern of characters in the text of said document;

determining the presence of a second steganographic code in said text;

said selectly effecting operation step comprises inhibiting said apparatus in response to detection of said overt character pattern; and generating alarm indicia in response to detection of said steganographic code.

18. The method of claim 12 wherein said pattern of characters comprises a steganographic code in said text;

and said selectively effecting operation step includes generating alarm indicia in response to detection of said steganographic code.

19. A system for selectively generating a copying actuation signal in accordance with the text of a document, comprising:

an optical scanner for generating respective character code signals indicative of a portion of the text of said document;

a random access memory for storing indicia of said character code signals;

processor means, cooperating with said random access memory, for making a determination of the presence of a predetermined sequence of characters in said portion of said text and selectively generating said copying actuation signal in accordance with said determination.

* * * * *